(12) United States Patent
Zeng et al.

(10) Patent No.: US 12,438,238 B1
(45) Date of Patent: Oct. 7, 2025

(54) INTER-CELL CONNECTION MATERIALS

(71) Applicant: Stacked Energy, Inc., San Jose, CA (US)

(72) Inventors: Qingcheng Zeng, San Jose, CA (US); Tobias Zeilinger, Palo Alto, CA (US); Kenzo Nagai, Fremont, CA (US); Donald G. Dafoe, San Jose, CA (US)

(73) Assignee: Stacked Energy, Inc., San Jose, CA (US)

( * ) Notice: Subject to any disclaimer, the term of this patent is extended or adjusted under 35 U.S.C. 154(b) by 757 days.

(21) Appl. No.: 17/659,100

(22) Filed: Apr. 13, 2022

Related U.S. Application Data

(62) Division of application No. 16/108,498, filed on Aug. 22, 2018, now Pat. No. 11,335,977.

(60) Provisional application No. 62/561,534, filed on Sep. 21, 2017.

(51) Int. Cl.
   *H01M 50/502* (2021.01)
   *H01M 10/0525* (2010.01)
   *H01M 10/0585* (2010.01)

(52) U.S. Cl.
   CPC ..... *H01M 50/502* (2021.01); *H01M 10/0525* (2013.01); *H01M 10/0585* (2013.01)

(58) Field of Classification Search
   CPC .. H01M 50/502; H01M 50/50; H01M 50/503; H01M 50/505; H01M 50/51; H01M 50/514; H01M 50/516; H01M 50/521; H01M 50/524; H01M 50/526; H01M 50/528; H01M 10/0585
   See application file for complete search history.

(56) References Cited

U.S. PATENT DOCUMENTS

| | | |
|---|---|---|
| 4,317,864 A | 3/1982 | Strasser |
| 4,374,186 A | 2/1983 | McCartney et al. |
| 4,567,119 A | 1/1986 | Lim |

(Continued)

FOREIGN PATENT DOCUMENTS

| | | |
|---|---|---|
| CN | 1439180 A | 8/2003 |
| CN | 1620735 A | 5/2005 |

(Continued)

OTHER PUBLICATIONS

U.S. Appl. No. 16/683,088, "Notice of Allowance", Nov. 22, 2021, 8 pages.

(Continued)

*Primary Examiner* — Matthew W Van Oudenaren
(74) *Attorney, Agent, or Firm* — Fenwick & West LLP

(57) ABSTRACT

Batteries according to embodiments of the present technology may include a first battery cell including a first current collector. The batteries may include a second battery cell including a second current collector. The second battery cell may be vertically aligned with the first battery cell, and the second current collector may be positioned adjacent the first current collector. The first battery cell and the second battery cell may be electrically coupled together so the first battery cell and the second battery cell transfer current through the cells between the first current collector and the second current collector. The batteries may also include a patterned coupling material disposed between the first battery cell and the second battery cell and joining the first current collector with the second current collector.

8 Claims, 5 Drawing Sheets

(56) References Cited

U.S. PATENT DOCUMENTS

| | | |
|---|---|---|
| 5,162,169 A | 11/1992 | Tomantschger et al. |
| 5,162,172 A | 11/1992 | Kaun |
| 5,254,415 A | 10/1993 | Williams et al. |
| 5,367,431 A | 11/1994 | Kunishi et al. |
| 5,837,158 A | 11/1998 | Shepodd et al. |
| 6,004,698 A | 12/1999 | Richardson et al. |
| 7,501,208 B2 | 3/2009 | Feddrix et al. |
| 8,124,266 B2 | 2/2012 | Yamazaki |
| 8,153,410 B2 | 4/2012 | Jaffe |
| 8,163,410 B2 | 4/2012 | Fulop et al. |
| 8,357,469 B2 | 1/2013 | Shaffer, II et al. |
| 8,663,833 B2 | 3/2014 | Hosaka et al. |
| 9,142,811 B2 | 9/2015 | Chami |
| 10,916,741 B1 | 2/2021 | Dafoe et al. |
| 10,916,796 B1 | 2/2021 | Zeilinger et al. |
| 10,923,728 B1 | 2/2021 | Zeng |
| 11,018,343 B1 | 5/2021 | Dafoe et al. |
| 11,043,703 B1 | 6/2021 | Zeng et al. |
| 11,189,834 B1 | 11/2021 | Zeng |
| 11,189,855 B1 | 11/2021 | O'Neill et al. |
| 11,228,074 B2 | 1/2022 | Kaye et al. |
| 11,296,351 B1 | 4/2022 | Gorer et al. |
| 11,296,361 B2 | 4/2022 | Chu et al. |
| 11,335,977 B1 | 5/2022 | Zeng et al. |
| 11,532,824 B2 | 12/2022 | Chu et al. |
| 11,588,155 B1 | 2/2023 | Erb et al. |
| 11,600,891 B1 | 3/2023 | Erb et al. |
| 11,677,120 B2 | 6/2023 | Erb et al. |
| 11,699,815 B1 | 7/2023 | Zeng et al. |
| 11,791,470 B2 | 10/2023 | Campbell et al. |
| 11,862,801 B1 | 1/2024 | Zeng |
| 11,888,112 B2 | 1/2024 | Kaye et al. |
| 11,923,494 B2 | 3/2024 | Erb et al. |
| 2001/0038939 A1 | 11/2001 | Bailey |
| 2002/0146620 A1 | 10/2002 | Connell |
| 2002/0164530 A1 | 11/2002 | Iwakura et al. |
| 2003/0027051 A1 | 2/2003 | Kejha et al. |
| 2003/0096170 A1 | 5/2003 | Fujiwara et al. |
| 2003/0194605 A1 | 10/2003 | Fauteux et al. |
| 2004/0001302 A1 | 1/2004 | Sato et al. |
| 2005/0019643 A1 | 1/2005 | Sugita et al. |
| 2005/0106456 A1 | 5/2005 | Puester et al. |
| 2005/0186478 A1 | 8/2005 | Iwakura et al. |
| 2006/0097701 A1 | 5/2006 | Kodama et al. |
| 2007/0015047 A1* | 1/2007 | Hosaka ............ H01M 10/0413 429/185 |
| 2007/0210760 A1 | 9/2007 | Shimamura et al. |
| 2008/0187824 A1 | 8/2008 | Tomantschger |
| 2009/0023059 A1 | 1/2009 | Kinoshita et al. |
| 2009/0068531 A1 | 3/2009 | Sawa et al. |
| 2009/0087728 A1 | 4/2009 | Less et al. |
| 2009/0117456 A1* | 5/2009 | Hosaka ............ H01M 10/0418 429/152 |
| 2009/0136832 A1 | 5/2009 | Mitsuda et al. |
| 2009/0233175 A1 | 9/2009 | Kelley et al. |
| 2009/0297892 A1 | 12/2009 | Ijaz et al. |
| 2009/0311584 A1* | 12/2009 | Yamazaki ......... H01M 10/0525 429/93 |
| 2010/0124693 A1 | 5/2010 | Kosugi et al. |
| 2010/0134942 A1 | 6/2010 | Wang et al. |
| 2010/0285355 A1 | 11/2010 | Kozinsky et al. |
| 2011/0014532 A1 | 1/2011 | Knuckey et al. |
| 2011/0294007 A1 | 12/2011 | Hosaka et al. |
| 2012/0148913 A1 | 6/2012 | Chiba |
| 2012/0156552 A1 | 6/2012 | Miyazaki et al. |
| 2012/0189896 A1 | 7/2012 | Zhou et al. |
| 2012/0219835 A1 | 8/2012 | Kawabe et al. |
| 2012/0263995 A1 | 10/2012 | Naito et al. |
| 2013/0065106 A1 | 3/2013 | Faust |
| 2013/0089774 A1 | 4/2013 | Chami |
| 2013/0242593 A1 | 9/2013 | Lorocco et al. |
| 2013/0266823 A1 | 10/2013 | Lee |
| 2013/0323542 A1* | 12/2013 | Wijayawardhana .. H01M 10/48 324/426 |
| 2014/0127542 A1 | 5/2014 | Li et al. |
| 2014/0154542 A1 | 6/2014 | Issaev et al. |
| 2014/0178735 A1 | 6/2014 | Wang et al. |
| 2014/0178753 A1 | 6/2014 | Chu et al. |
| 2015/0037616 A1 | 2/2015 | Wyatt et al. |
| 2015/0155564 A1 | 6/2015 | Chami et al. |
| 2015/0200393 A1 | 7/2015 | Li et al. |
| 2015/0228937 A1 | 8/2015 | Spilker |
| 2015/0236543 A1 | 8/2015 | Brushett et al. |
| 2015/0280259 A1 | 10/2015 | Anderson et al. |
| 2015/0311490 A1 | 10/2015 | Murase et al. |
| 2015/0325894 A1 | 11/2015 | Merriman et al. |
| 2016/0049646 A1 | 2/2016 | Fujiki et al. |
| 2016/0049679 A1 | 2/2016 | Stevens et al. |
| 2016/0093845 A1 | 3/2016 | Dekeuster et al. |
| 2016/0099456 A1 | 4/2016 | Kwon et al. |
| 2016/0099490 A1 | 4/2016 | Larsson |
| 2016/0111729 A1 | 4/2016 | Kim et al. |
| 2016/0197352 A1 | 7/2016 | Blaser et al. |
| 2016/0248113 A1 | 8/2016 | He et al. |
| 2016/0329535 A1 | 11/2016 | Moomaw et al. |
| 2016/0329606 A1 | 11/2016 | Ro et al. |
| 2017/0012331 A1 | 1/2017 | Ng et al. |
| 2017/0077545 A1 | 3/2017 | Shaffer, II et al. |
| 2017/0110765 A1 | 4/2017 | Yadav et al. |
| 2017/0133689 A1 | 5/2017 | Moore et al. |
| 2017/0214057 A1 | 7/2017 | Kotik et al. |
| 2017/0250434 A1 | 8/2017 | Gennett et al. |
| 2018/0013133 A1 | 1/2018 | Armacanqui et al. |
| 2018/0013144 A1 | 1/2018 | Li et al. |
| 2018/0079721 A1 | 3/2018 | Armand et al. |
| 2018/0097248 A1 | 4/2018 | Nariyama et al. |
| 2018/0175427 A1 | 6/2018 | Nariyama |
| 2018/0175470 A1 | 6/2018 | Bai et al. |
| 2018/0219227 A1 | 8/2018 | Moomaw et al. |
| 2018/0226654 A1 | 8/2018 | Ohsawa et al. |
| 2018/0294454 A1 | 10/2018 | Mackenzie et al. |
| 2018/0316063 A1 | 11/2018 | Masel et al. |
| 2018/0316064 A1 | 11/2018 | Wei et al. |
| 2019/0036147 A1 | 1/2019 | Yuan et al. |
| 2019/0237748 A1 | 8/2019 | Shin et al. |
| 2020/0028166 A1 | 1/2020 | Tanaka et al. |
| 2020/0083505 A1 | 3/2020 | Kaye et al. |
| 2020/0212440 A1 | 7/2020 | Kolhekar et al. |
| 2020/0395594 A1 | 12/2020 | Doi et al. |
| 2021/0028457 A1 | 1/2021 | Newhouse et al. |
| 2022/0111758 A1 | 4/2022 | Ijaz et al. |
| 2022/0111759 A1 | 4/2022 | Ijaz |
| 2022/0115897 A1 | 4/2022 | Ijaz |
| 2023/0026549 A1 | 1/2023 | Ijaz et al. |

FOREIGN PATENT DOCUMENTS

| | | |
|---|---|---|
| CN | 101202355 A | 6/2008 |
| CN | 101809801 A | 8/2010 |
| CN | 101884125 A | 11/2010 |
| CN | 102005566 A | 4/2011 |
| CN | 102187504 A | 9/2011 |
| CN | 102272977 A | 12/2011 |
| CN | 102341948 A | 2/2012 |
| CN | 102473984 A | 5/2012 |
| CN | 102576850 A | 7/2012 |
| CN | 103069614 A | 4/2013 |
| CN | 103165920 A | 6/2013 |
| CN | 103222098 A | 7/2013 |
| CN | 103548196 A | 1/2014 |
| CN | 103650216 A | 3/2014 |
| CN | 103855360 A | 6/2014 |
| CN | 103904294 A | 7/2014 |
| CN | 104466191 A | 3/2015 |
| CN | 104604003 A | 5/2015 |
| CN | 104779412 A | 7/2015 |
| CN | 107851747 A | 3/2018 |
| EP | 1125336 A1 | 8/2001 |
| EP | 1156547 A1 | 11/2001 |
| EP | 2892097 A1 | 7/2015 |
| EP | 3196955 A1 | 7/2017 |
| EP | 3317907 A | 5/2018 |
| EP | 3435473 A1 | 1/2019 |
| JP | 6435864 A | 2/1989 |

(56) References Cited

FOREIGN PATENT DOCUMENTS

| | | |
|---|---|---|
| JP | 0562683 A | 3/1993 |
| JP | 06503442 A | 4/1994 |
| JP | 07161346 A | 6/1995 |
| JP | 2001357854 A | 12/2001 |
| JP | 2002343452 A | 11/2002 |
| JP | 2003096219 A | 4/2003 |
| JP | 3522303 B2 | 4/2004 |
| JP | 2005005163 A | 1/2005 |
| JP | 2006012556 A | 1/2006 |
| JP | 2007012584 A | 1/2007 |
| JP | 2009224097 A | 10/2009 |
| JP | 2011009203 A | 1/2011 |
| JP | 2011071011 A | 4/2011 |
| JP | 4857710 B2 | 1/2012 |
| JP | 2012234823 A | 11/2012 |
| JP | 2013114746 A | 6/2013 |
| JP | 2013187074 A | 9/2013 |
| JP | 5410822 B2 | 2/2014 |
| JP | 2014029818 A | 2/2014 |
| JP | 2018083957 A | 5/2018 |
| JP | 2018519646 A | 7/2018 |
| JP | 6636607 | 12/2019 |
| KR | 20130066795 A | 6/2013 |
| WO | 8504287 A1 | 9/1985 |
| WO | 9210861 A1 | 6/1992 |
| WO | 2010111087 A1 | 9/2010 |
| WO | 2016031689 A1 | 3/2016 |
| WO | 2017007827 A1 | 1/2017 |
| WO | 2018057566 A1 | 3/2018 |
| WO | 2018195372 A1 | 10/2018 |
| WO | 2018213601 A2 | 11/2018 |
| WO | 2019023010 A1 | 1/2019 |
| WO | 2019059133 A1 | 3/2019 |
| WO | 2019184311 A1 | 10/2019 |
| WO | 2019245461 A1 | 12/2019 |
| WO | 2021048028 A1 | 3/2021 |

OTHER PUBLICATIONS

U.S. Appl. No. 16/683,091 , "Non-Final Office Action", Aug. 18, 2021, 22 pages.
U.S. Appl. No. 16/748,586 , "Final Office Action", Nov. 15, 2021, 11 pages.
U.S. Appl. No. 16/748,586 , "Non-Final Office Action", May 14, 2021, 12 pages.
U.S. Appl. No. 16/748,586 , "Notice of Allowance", Feb. 2, 2022, 8 pages.
U.S. Appl. No. 17/014,637 , "Non-Final Office Action", Jul. 25, 2022, 20 pages.
U.S. Appl. No. 17/014,768 , "Non-Final Office Action", Jun. 30, 2022, 10 pages.
Boeva , et al., "Soluble and Highly Ionically Conducting Interpolyelectrolyte Complexes Prepared via Chemical Template Polymerization of Aniline in the Presence of Perfluorinated Polysulfonic Acid", The Royal Society of Chemistry, vol. 4, No. 100, Oct. 31, 2014, pp. 56677-56681.
Yu , et al., "Enhancing the Supercapacitor Performance of Graphene/ MnO2 Nanostructured Electrodes by Conductive Wrapping", Nano Letters, vol. 11, No. 10, Oct. 12, 2011, pp. 4438-4442.
China Patent Application No. 201680039891.9 , "Office Action", Jan. 6, 2020, 23 pages.
China Patent Application No. 201680039891.9 , "Office Action", Jun. 10, 2020, 18 pages.
China Patent Application No. 201680039891.9 , "Office Action", Oct. 27, 2020, 8 pages.
China Patent Application No. 201780053071.X , "Office Action", Apr. 16, 2021, 21 pages.
China Patent Application No. 201780053071.X , "Office Action", Aug. 30, 2022, 17 pages.
China Patent Application No. 201780053071.X , "Office Action", Mar. 18, 2022, 15 pages.
China Patent Application No. 201780053071.X , "Office Action", Nov. 2, 2021, 20 pages.
China Patent Application No. 201880026199.1 , "Office Action", Mar. 3, 2022, 8 pages.
China Patent Application No. 201880047002.2 , "Office Action", Nov. 24, 2021, 16 pages.
China Patent Application No. 202011204662.2 , "Office Action", Aug. 26, 2022, 14 pages.
China Patent Application No. 202011211648.5 , "Office Action", Aug. 19, 2022, 12 pages.
European Patent Application No. 16738994.9 , "Notice of Decision to Grant", Sep. 24, 2020, 2 pages.
European Patent Application No. 16738994.9 , "Office Action", Mar. 23, 2018, 3 pages.
Huang , et al., "Understanding the Second Electron Reaction Mechanism of γ-MnO2 and the Rechargeability of Spinel Phases in Alkaline Zn|MnO2 Batteries", ECS Meeting Abstracts, vol. MA2018-02, 2018, 4 pages.
Weng , et al., "Three-Electrolyte Electrochemical Energy Storage Systems Using Both Anion- and Cation-Exchange Membranes as Separators", Energy, vol. 167, Jan. 15, 2019, pp. 1-32.
Japan Patent Application No. 2018-500449 , "Office Action", Jan. 21, 2019, 11 pages.
Korea Patent Application No. 10-2018-7000263 , "Notice of Decision to Grant", Apr. 8, 2020, 2 pages.
Korea Patent Application No. 10-2018-7000263 , "Office Action", Feb. 28, 2019, 5 pages.
Korea Patent Application No. 10-2018-7000263 , "Office Action", Sep. 27, 2019, 16 pages.
PCT/US2016/041151 , "International Preliminary Report on Patentability", Jan. 18, 2018, 8 pages.
PCT/US2016/041151 , "International Search Report and Written Opinion", Aug. 25, 2016, 10 pages.
PCT/US2017/052413 , "International Preliminary Report on Patentability", Apr. 4, 2019, 12 pages.
PCT/US2017/052413 , "International Search Report and Written Opinion", Feb. 1, 2018, 19 pages.
PCT/US2017/052413 , "Invitation to Pay Additional Fees and, Where Applicable, Protest Fee", Dec. 8, 2017, 11 pages.
PCT/US2018/028472 , "International Preliminary Report on Patentability", Oct. 31, 2019, 10 pages.
PCT/US2018/028472 , "International Search Report and Written Opinion", Jul. 27, 2018, 13 pages.
PCT/US2018/033218 , "International Preliminary Report on Patentability", Nov. 28, 2019, 9 pages.
PCT/US2018/033218 , "International Search Report and Written Opinion", Nov. 16, 2018, 13 pages.
PCT/US2018/042598 , "International Preliminary Report on Patentability", Feb. 6, 2020, 10 pages.
PCT/US2018/042598 , "International Search Report and Written Opinion", Oct. 2, 2018, 14 pages.
PCT/US2020/060348 , "International Preliminary Report on Patentability", May 27, 2022, 8 pages.
PCT/US2020/060348 , "International Search Report and Written Opinion", Mar. 12, 2021, 9 pages.
PCT/US2020/060350 , "International Preliminary Report on Patentability", May 27, 2022, 8 pages.
PCT/US2020/060350 , "International Search Report and Written Opinion", Mar. 12, 2021, 12 pages.
PCT/US2021/049023 , "International Search Report and Written Opinion", Dec. 22, 2021, 11 pages.
Thuc , et al., "Study on Synthesis and Characterization of Anion Exchange Membrane Based on Poly (Vinyl Alcohol) Modified by Free-Radical Polymerization", International Journal of Electrochemical Science, vol. 15, Jul. 10, 2020, pp. 8190-8199.
China Patent Application No. 201880026199.1, Office Action, May 10, 2023, 20 pages.
International Patent Application No. PCT/US2021/049023, International Preliminary Report on Patentability, Mar. 23, 2023, 8 pages.
Thaler, et al., "Automotive Battery Technology", Beijing Institute of Technology Press, Feb. 28, 2017, 5 pages.

(56) References Cited

OTHER PUBLICATIONS

U.S. Appl. No. 16/108,503, "Final Office Action", Oct. 12, 2022, 8 pages.
U.S. Appl. No. 17/014,550, "Notice of Allowance", Oct. 18, 2022, 10 pages.
U.S. Appl. No. 17/014,717, "Non-Final Office Action", Oct. 13, 2022, 14 pages.
U.S. Appl. No. 17/353,059, "Non-Final Office Action", Nov. 1, 2022, 8 pages.
Machine Translation of JP 2001357854 A, Dec. 26, 2001, 18 pages.
U.S. Appl. No. 18/054,800, Non-Final Office Action, Jul. 5, 2024, 8 pages.
China Patent Application No. 201880026199.1, Office Action, Apr. 30, 2024, 22 pages.
U.S. Appl. No. 16/273,625, "Corrected Notice of Allowability", Nov. 16, 2022, 2 pages.
U.S. Appl. No. 17/014,550, "Corrected Notice of Allowability", Nov. 14, 2022, 2 pages.
U.S. Appl. No. 17/014,637, "Final Office Action", Dec. 1, 2022, 24 pages.
U.S. Appl. No. 17/014,768, "Corrected Notice of Allowability", Nov. 14, 2022, 2 pages.
U.S. Appl. No. 17/014,768, "Notice of Allowance", Nov. 4, 2022, 7 pages.
China Patent Application No. 201880026199.1, "Office Action", Dec. 15, 2022, 13 pages.
U.S. Appl. No. 15/742,009, "Advisory Action", dated Oct. 28, 2020, 4 pages.
U.S. Appl. No. 15/742,009, "Final Office Action", dated Aug. 19, 2020, 13 pages.
U.S. Appl. No. 15/742,009, "Non-Final Office Action", dated Aug. 3, 2021, 16 pages.
U.S. Appl. No. 15/742,009, "Non-Final Office Action", dated Nov. 15, 2019, 14 pages.
U.S. Appl. No. 15/742,009, "Non-Final Office Action", dated Nov. 30, 2020, 13 pages.
U.S. Appl. No. 15/742,009, "Notice of Allowance", dated Dec. 24, 2021, 12 pages.
U.S. Appl. No. 15/742,009, "Restriction Requirement", dated Jun. 11, 2019, 8 pages.
U.S. Appl. No. 15/962,133, "Advisory Action", dated Nov. 18, 2020, 3 pages.
U.S. Appl. No. 15/962,133, "Final Office Action", dated Jul. 7, 2020, 5 pages.
U.S. Appl. No. 15/962,133, "Non-Final Office Action", dated Jan. 21, 2020, 10 pages.
U.S. Appl. No. 15/962,133, "Notice of Allowance", dated Feb. 9, 2021, 8 pages.
U.S. Appl. No. 16/007,534, "Non-Final Office Action", dated May 5, 2020, 11 pages.
U.S. Appl. No. 16/007,534, "Notice of Allowance", dated Nov. 18, 2020, 8 pages.
U.S. Appl. No. 16/038,865, "Final Office Action", dated Jun. 1, 2021, 7 pages.
U.S. Appl. No. 16/038,865, "Non-Final Office Action", dated Nov. 6, 2020, 13 pages.
U.S. Appl. No. 16/038,865, "Notice of Allowance", dated Aug. 13, 2021, 8 pages.
U.S. Appl. No. 16/049,250, "Non-Final Office Action", dated Apr. 8, 2020, 8 pages.
U.S. Appl. No. 16/049,250, "Notice of Allowance", dated Oct. 7, 2020, 7 pages.
U.S. Appl. No. 16/108,498, "Corrected Notice of Allowability", dated Mar. 9, 2022, 2 pages.
U.S. Appl. No. 16/108,498, "Final Office Action", dated Dec. 9, 2020, 25 pages.
U.S. Appl. No. 16/108,498, "Non-Final Office Action", dated Apr. 30, 2020, 9 pages.
U.S. Appl. No. 16/108,498, "Non-Final Office Action", dated May 17, 2021, 21 pages.
U.S. Appl. No. 16/108,498, "Notice of Allowance", dated Feb. 24, 2022, 11 pages.
U.S. Appl. No. 16/108,503, "Final Office Action", dated May 25, 2021, 9 pages.
U.S. Appl. No. 16/108,503, "Non-Final Office Action", dated Feb. 2, 2022, 9 pages.
U.S. Appl. No. 16/108,503, "Non-Final Office Action", dated Oct. 2, 2020, 11 pages.
U.S. Appl. No. 16/108,522, "Non-Final Office Action", dated Sep. 9, 2020, 10 pages.
U.S. Appl. No. 16/108,522, "Notice of Allowance", dated Feb. 26, 2021, 8 pages.
U.S. Appl. No. 16/245,542, "Non-Final Office Action", dated May 11, 2021, 14 pages.
U.S. Appl. No. 16/245,542, "Notice of Allowance", dated Dec. 17, 2021, 5 pages.
U.S. Appl. No. 16/263,890, "Non-Final Office Action", dated Jun. 16, 2020, 9 pages.
U.S. Appl. No. 16/263,890, "Notice of Allowance", dated Oct. 23, 2020, 8 pages.
U.S. Appl. No. 16/273,625, "Final Office Action", dated Feb. 16, 2021, 14 pages.
U.S. Appl. No. 16/273,625, "Non-Final Office Action", dated Dec. 24, 2021, 16 pages.
U.S. Appl. No. 16/273,625, "Non-Final Office Action", dated May 4, 2020, 14 pages.
U.S. Appl. No. 16/273,625, "Notice of Allowance", dated Sep. 1, 2022, 12 pages.
U.S. Appl. No. 16/522,475, "Non-Final Office Action", dated May 17, 2021, 17 pages.
U.S. Appl. No. 16/538,660, "Final Office Action", dated Oct. 13, 2021, 15 pages.
U.S. Appl. No. 16/538,660, "Non-Final Office Action", dated Feb. 16, 2021, 12 pages.
U.S. Appl. No. 16/538,660, "Notice of Allowance", dated Feb. 16, 2022, 8 pages.
U.S. Appl. No. 16/613,094, "Non Final Office Action", dated Aug. 19, 2022, 16 Pages.
U.S. Appl. No. 16/658,442, "Final Office Action", dated Aug. 16, 2022, 15 pages.
U.S. Appl. No. 16/658,442, "Non-Final Office Action", dated Feb. 22, 2022, 16 pages.
U.S. Appl. No. 16/683,088, "Final Office Action", dated Oct. 12, 2021, 12 pages.
U.S. Appl. No. 16/683,088, "Non-Final Office Action", dated Sep. 2, 2021, 10 pages.
U.S. Appl. No. 16/796,299, "Non-Final Office Action", Apr. 1, 2022, 15 pages.
U.S. Appl. No. 16/796,430, "Non-Final Office Action", Feb. 11, 2022, 23 pages.
U.S. Appl. No. 16/855,170, "Non-Final Office Action", Jul. 27, 2021, 13 pages.
U.S. Appl. No. 16/855,170, "Notice of Allowance", Sep. 24, 2021, 9 pages.
U.S. Appl. No. 17/014,637, "Non-Final Office Action", Feb. 24, 2022, 20 pages.

* cited by examiner

INTER-CELL CONNECTION MATERIALS

CROSS-REFERENCE TO RELATED APPLICATION

This application is a divisional of U.S. patent application Ser. No. 16/108,498, filed Aug. 22, 2018, which claims the benefit of U.S. Application Ser. No. 62/561,534, filed Sep. 21, 2017, the entire disclosure of which are hereby incorporated by reference for all purposes.

TECHNICAL FIELD

The present technology relates to batteries and battery components. More specifically, the present technology relates to materials and methods for connecting cells of a battery.

BACKGROUND

In batteries having multiple battery cells, materials may be used for coupling cells together. These materials may impact multiple aspects of completed batteries. Improved designs and processes are needed.

SUMMARY

The present technology relates to energy storage devices, including battery cells and batteries, which may include lithium-ion batteries having a variety of shapes including stacked cells, which may be or include bipolar batteries as well as batteries stacked in any orientation including vertical and horizontal, for example. These devices may include current collectors configured based on a z-direction transmission of current through the cell components, although current collectors configured based on an xy-directional transmission of current may also benefit from the present designs. The batteries and cells may include a host of features and material configurations as will be described throughout the disclosure.

Batteries according to embodiments of the present technology may include a first battery cell including a first current collector. The batteries may include a second battery cell including a second current collector. The second battery cell may be vertically aligned with the first battery cell, and the second current collector may be positioned adjacent the first current collector. The first battery cell and the second battery cell may be electrically coupled together so the first battery cell and the second battery cell transfer current through the cells between the first current collector and the second current collector. The batteries may also include a patterned coupling material disposed between the first battery cell and the second battery cell and joining the first current collector with the second current collector.

In some embodiments, the patterned coupling material may include a non-conductive adhesive. The non-conductive adhesive may be coated discontinuously between the first current collector and the second current collector. The first current collector may be in contact with the second current collector at a plurality of locations at which gaps occur in the non-conductive adhesive coating. The patterned coupling material may also include a metal-containing material characterized by a melting temperature below about 100° C. The metal-containing material may be or include a tin alloy. The metal-containing material may form a conductive bond between the first current collector and the second current collector. The patterned coupling material may be characterized by a Young's modulus greater than or about 1,000 MPa.

Embodiments of the present technology also encompass stacked batteries. The stacked batteries may include a first battery cell including a cathode current collector. The stacked batteries may include a second battery cell disposed in vertical alignment with the first battery cell. The second battery cell may include an anode current collector. The stacked battery cell may include an adhesive foil positioned between and electrically coupling the cathode current collector of the first battery cell with the anode current collector of the second battery cell.

In some embodiments, the adhesive foil includes a metal material having adhesive disposed discontinuously along a first surface of the metal material and a second surface of the metal material opposite the first surface of the metal material. The adhesive foil may include a metal material characterized by alternating sections including a set of first sections extending parallel to the anode current collector or the cathode current collector, and a set of second sections extending substantially orthogonally to the anode current collector or the cathode current collector. The alternating sections may define a series of trenches along a length of the metal material, and an adhesive may be disposed within each trench of the series of trenches. The adhesive may include a non-conductive adhesive. Each section of the set of first sections may alternate between being positioned adjacent the cathode current collector and the anode current collector. Each section of the set of first sections may be in electrical contact with either the cathode current collector of the first battery cell or the anode current collector of the second battery cell. A subset of sections of the set of first sections may be characterized by a length greater than a length of each section of the set of second sections. The metal material may include at least one metal selected from the group consisting of aluminum, copper, and titanium. The stacked battery may be characterized by an area greater than about 0.25 m$^2$.

Embodiments of the present technology also encompass methods of forming an adhesive foil on a stacked battery. The methods may include depositing a first adhesive in a first pattern along a first current collector of a first battery cell. The methods may include forming a layer of conductive material across the first current collector. The layer of conductive material may extend across the first pattern of the first adhesive and contact the first current collector within gaps in the first pattern of the first adhesive. The methods may include depositing a second adhesive in a second pattern on the conductive material or on a second current collector of a second battery cell. The methods may also include coupling the second battery cell with the first battery cell. The layer of conductive material may extend across the second pattern of the second adhesive and contact the second current collector within gaps in the second pattern of the second adhesive. In some embodiments, the first current collector may be a cathode current collector of the first battery cell, and the second current collector may be an anode current collector of the second battery cell.

Such technology may provide numerous benefits over conventional technology. For example, the number of adhesives available to configurations according to the present technology may be increased. Additionally, configurations according to embodiments of the present technology may provide more uniform distribution of current between cells of a battery. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1:
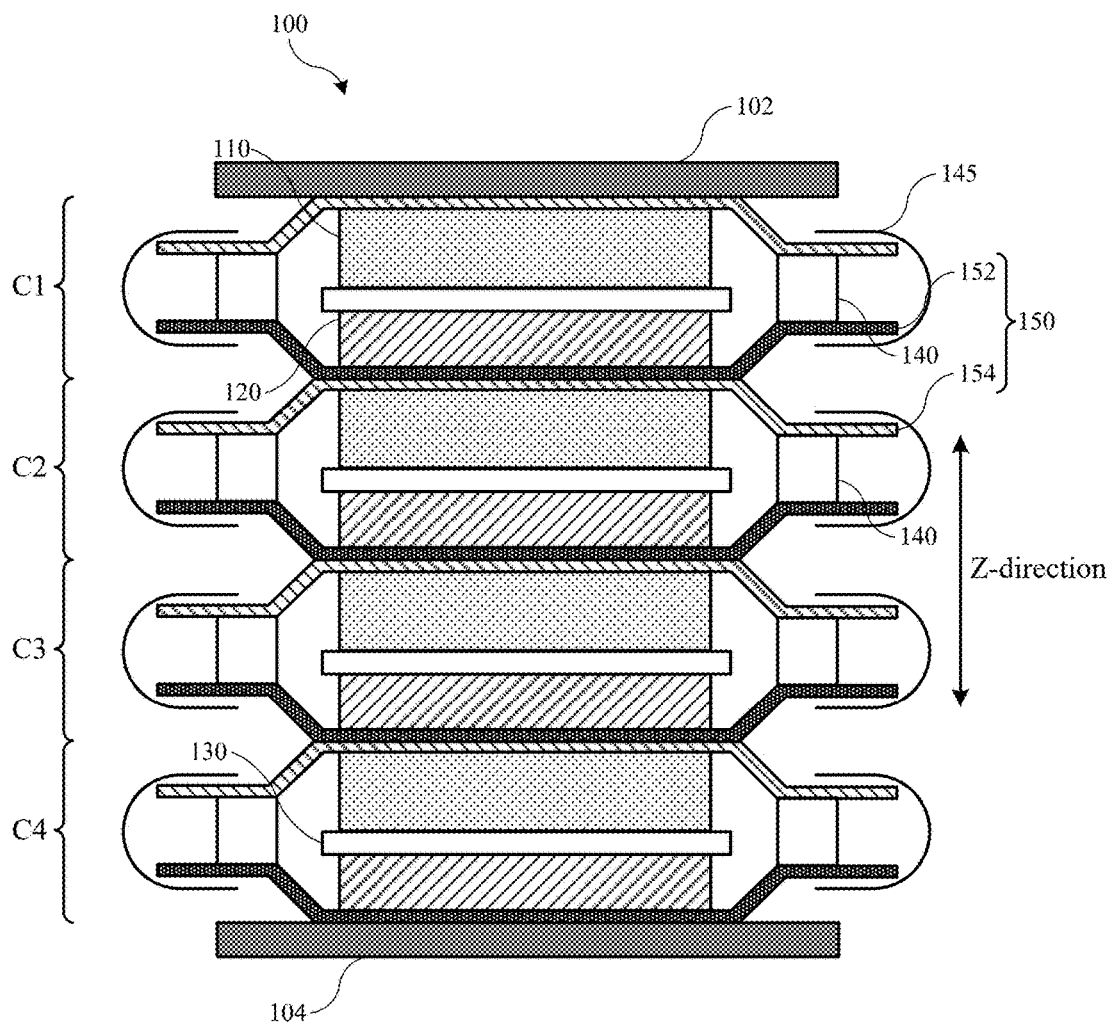
FIG. 1 shows a schematic cross-sectional view of an energy storage device according to some embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, and more generally energy storage devices, may include multiple battery cells coupled with one another in a series or a parallel electrical configuration. The cells may also be physically coupled with one another to form the battery. Batteries having cells in a stacked orientation and characterized by z-direction transmission of current through the cells may include a conductive coupling material between adjacent cells. The coupling material may include a combination of a conductive material to enable transmission between the adjacent cells as well as a binder or adhesive material to allow physical coupling of the cells. This combination material may require a balance between conductive properties and adhesive properties.

For example, increasing the amount of conductive material may reduce the bonding strength of the adhesive. Conversely, increasing the amount of binder in the adhesive may reduce the conductivity and efficiency of transmission between cells. Additionally, for batteries characterized by a larger surface area, along with the corresponding cells, providing a uniform consistency of adhesive as well as a uniform coating of adhesive may be difficult to accomplish during fabrication. Larger cells and/or mobile devices in which the batteries are used may also compel increased bonding strength to account for potentially greater weight as well as increased tolerance for vibration or jostling due to use of the device. This may further limit the types of adhesives available as well as the ratio of conductive materials to adhesive materials that provide adequate functionality.

The present technology may overcome many of these issues by using materials that decouple the adhesive functionality from the conductive functionality. By utilizing designs providing direct contact regions for current collectors between adjacent cells, or using multi-part coupling materials, the present technology may afford an increased range of suitable materials, as well as superior conductive and adhesive properties of the produced components.

Although the remaining portions of the description will routinely reference lithium-ion batteries, it will be readily understood by the skilled artisan that the technology is not so limited. The present designs may be employed with any number of battery or energy storage devices, including other rechargeable and primary, or non-rechargeable, battery types, as well as electrochemical capacitors also known as supercapacitors or ultracapacitors. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, as well as any other device that may use batteries or benefit from the discussed designs. Accordingly, the disclosure and claims are not to be considered limited to any particular example discussed, but can be utilized broadly with any number of devices that may exhibit some or all of the electrical or chemical characteristics of the discussed examples.

FIG. 1 depicts a schematic cross-sectional view of an energy storage device according to embodiments of the present technology. The energy storage devices may include a single current collector or coupled current collectors. The energy storage devices may operate in a conventional manner with regard to electronic flow across or through material layers, such as providing electronic mobility across an xy-plane of the current collectors. Additionally, the described devices may operate by electronic flow through the structure in a z-direction through individual cells as opposed to via tabbed current collectors as described above for conventional batteries.

As illustrated, the stacked battery 100 may include a stack of electrochemical cells C1, C2, C3, and C4 between end plates 102 and 104. End plates 102 and 104 may be metal current collector plates, which can serve both electrical and mechanical functions. In some embodiments, end plates 102 and 104 can be support plates that form part of an external housing of the stacked battery. End plates 102 and 104 may also provide mechanical support within a housing of the stacked battery. Some or all of the support plates may be electrically conductive, and there may be a terminal within the support plate that is electrically connected to the end plate. In embodiments an additional plate similar to end plates 102 and 104 may be disposed within the stack of cells, such as between two cells. This configuration including an additional plate may provide structural rigidity, and the additional plate may also preform electronic functions similar to end plates 102, 104. End plates 102 and 104 may act as positive and negative terminals of the battery. The cells may pass current in the z-direction through individual cells to the end plates, which may transfer current in any direction across the plate and from the battery.

The stack of electrochemical cells may include any number of electrochemical cells depending on the selected voltage for the stacked battery 100, along with the individual voltage of each individual electrochemical cell. The cell stack may be arranged with as many or as few electrochemical cells in series as desired, as well as with intervening plates for support and current transfer. The cells C may be positioned adjacent, e.g. abutting, one another in some configurations. Each electrochemical cell C may include a cathode 110 and an anode 120, where the cathode 110 and anode 120 may be separated by separator 130 between the cathode and anode. Between the anode 120 of cell C1 and the cathode of adjacent cell C2 may be a stacked current collector 150. The stacked current collector 150 may form part of C1 and C2. On one side, stacked current collector 150 may be connected to the seal 140 of C1 and connected on an opposing side to the seal 140 of C2.

In some embodiments, as shown in FIG. 1, stacked current collector 150 may include a first current collector 152 and a second current collector 154. In embodiments one or both of the current collectors may include a metal or a non-metal material, such as a polymer or composite. As shown in the figure, in some embodiments the first current collector 152 and second current collector 154 can be different materials. In some embodiments, the first current collector 152 may be a material selected based on the potential of the anode 120, such as copper or any other suitable metal, as well as a non-metal material including a polymer. The second current collector may be a material selected based on the potential of the cathode 110, such as aluminum or other suitable metals, as well as a non-metal material including a polymer. In other words, the materials for the first and second current collectors can be selected based on electrochemical compatibility with the anode and cathode active materials used.

The first and second current collectors can be made of any material known in the art. For example, copper, aluminum, or stainless steel may be used, as well as composite materials having metallic aspects, and non-metallic materials including polymers. In some instances the metals or non-metals used in the first and second current collector can be the same or different. The materials selected for the anode and cathode active materials can be any suitable battery materials. For example, the anode material can be silicon, graphite, carbon, a tin alloy, lithium metal, a lithium containing material, such as lithium titanium oxide (LTO), or other suitable materials that can form an anode in a battery cell. Additionally, for example, the cathode material can be a lithium-containing material. In some embodiments, the lithium-containing material can be a lithium metal oxide, such as lithium cobalt oxide, lithium manganese oxide, lithium nickel manganese cobalt oxide, lithium nickel cobalt aluminum oxide, or lithium titanate, while in other embodiments, the lithium-containing material can be a lithium iron phosphate, or other suitable materials that can form a cathode in a battery cell.

The first and second current collectors may have any suitable thickness, and may have a thickness that allows for a seal to be formed and provides suitable mechanical stability to prevent failure, such as breakage of the layers, during anticipated usage of the stacked battery. Additionally, the thickness of the current collectors can be sufficiently thin to allow for bending and flexing in the separation region to accommodate expansion anticipated during cycling of the stacked battery, including, for example, up to 10% expansion in the z-direction.

Figure 2:
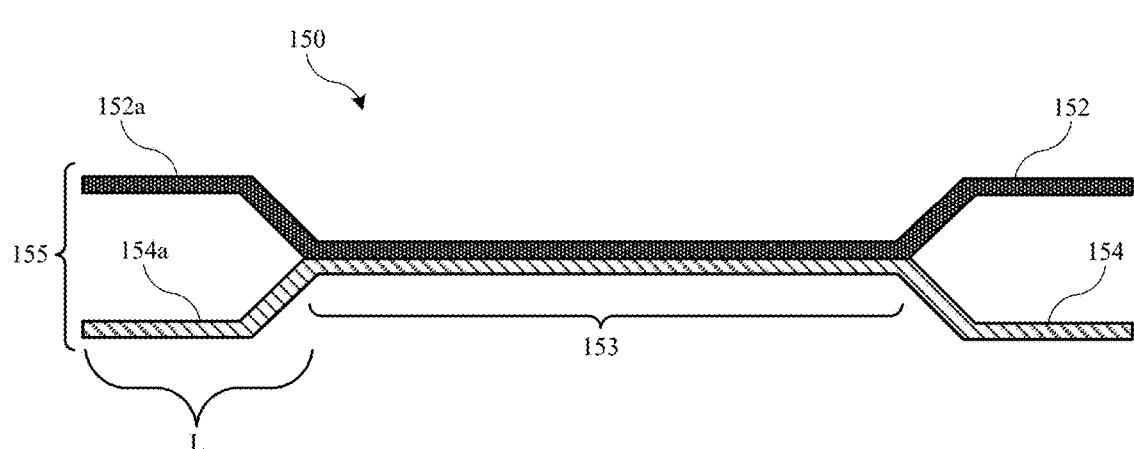
FIG. 2 shows a schematic cross-sectional view of a current collector according to some embodiments of the present technology.

Turning to FIG. 2, the stacked current collector 150 may have a connection region 153 where the first current collector 152 and second current collector 154 may be connected, and a gap region 155 at the peripheral ends of the collector 150. In the connection region 153, the first current collector and second current collector may be in direct contact or otherwise joined to be electrically-conductive. In some embodiments, the first current collector and second current collector may be directly connected, while in other embodiments the first current collector and second current collector may be indirectly connected via a conductive or adhesive material. To form the connection region 153, the first current collector 152 and the second current collector 154 may be laminated together. Additionally, the connection region 153 may be created by welding the first current collector 152 and the second current collector 154 together. The connection region 153 may also be created by using an adhesive, which may be electrically conductive, between the first current collector 152 and the second current collector 154. In other embodiments, the connection region 153 may be created by the wetting that can occur between the materials of the first current collector 152 and the second current collector 154.

In the gap region 155, the peripheral ends of the first current collector 152 and the second current collector 154 may be spaced apart and moveable relative to each other. As such, there may be a separation distance between the first and second current collectors, which may increase as the electrochemical cell swells. In some embodiments, the spaced apart peripheral ends of the first current collector 152 and the second current collector 154 may be of a length that is sufficient to accommodate an anticipated expansion of the individual electrochemical cells of the stacked battery during cycling of the battery. The peripheral ends of the current collectors 152a and 154a may have a length L, as shown in FIG. 2, which may be long enough that up to or at least about 10% expansion in the z-direction can be accommodated.

As shown in FIG. 1, each cell C1, C2, C3, and C4, also includes a seal 140, which, with the current collector layers, may electrochemically isolate the electrochemical cells from each other. Thus, each cathode-anode pair may be electrochemically sealed and isolated from neighboring electrochemical cells. Because the current collectors 152 and 154 may be separated at the peripheral ends, separate seals 140 can be formed on opposing sides, such as a top and bottom, of the stacked current collector 150. The seals 140 may be the same or different materials, and each seal 140 may also be a laminate, composite, or coupling of two or more materials in embodiments.

The seal material may be able to bond with the first and second layers of the stacked current collector to prevent electrolyte leakage. The seal material may be a polymer, an epoxy, or other suitable electrically-insulating material that can bond with first and second current collectors to create a seal, which may be a hermetic seal. In some embodiments, the polymer may be polypropylene, polyethylene, polyethylene terephthalate, polytrimethylene terephthalate, polyimide, or any other suitable polymer that may bond with the first and second current collectors of the stacked current collector to form a hermetic seal and may also provide resistance to moisture ingress. The electrolyte may be a solid, a gel, or a liquid in embodiments. The seal may electrochemically isolate each electrochemical cell by hermetically sealing the cell, thereby preventing ions in the electrolyte from escaping to a neighboring electrochemical cell. The seal material may be any material providing adequate bonding with the metal layers such that the seal may be maintained through a predetermined period of time or battery usage.

The separator may be wetted with the electrolyte, such as a fluid electrolyte or gel electrolyte, to incorporate the electrolyte into the stacked battery. Alternatively, a gel electrolyte may coat the separator. In still further alternatives, a gel electrolyte may coat the first metal layer and/or second metal layer before combination. Additionally, the electrolyte may be blended with particles of electrode active material. In various embodiments, incorporating the electrolyte into the components of the stacked battery may reduce gassing in the stacked battery. In variations that include a flexible seal, the stacked battery may accommodate gas resulting from degassing.

The individual electrochemical cells may be formed in any suitable manner. In some embodiments, the cathode 110, the anode 120, and the separator 130 may be preassembled. A first current collector 152 may then be connected to the anode while a second current collector 154 may be connected to the cathode to create a cell. The seal material may be disposed between the first current collector 152 and the second current collector 154 to form seals 140. Finally, the peripheral ends of the sealed electrochemical cell may be further taped to frame the cell. Tapes 145, as well as other coatings, sealing, or material layers, may be disposed around the outer perimeter of the metal layers and seals. The tape 145 may be substituted with ceramic or polymeric materials. Tape 145 may be included for various reasons including to prevent shorting to adjacent layers or to surrounding conductive surfaces within the device, to provide improved electrochemical or chemical stability, and to provide mechanical strength.

FIGS. 1 and 2 illustrate an exemplary stacked battery design according to the present technology. Additional configurations other than illustrated, or as variations on the designs, are also encompassed by the present technology. For example, certain embodiments may not include an additional seal material, and first current collector 152 and second current collector 154 may be directly coupled or bonded together. Additionally, the current collectors may include designs including combinations of polymer material and conductive materials, such as within a matrix.

An exemplary matrix for a current collector may include a polymer disposed as the matrix material or as part of the matrix material. The matrix may provide an insulative design that limits or reduces xy-directional conductivity. The polymer matrix may be developed with a conductive material to produce a current collector having particular electrochemical or composite properties, such as electrical conductivity in the z-direction or through the cell. For example, conductive particulate material may be incorporated within the matrix. The conductive material may include any of the conductive materials previously identified. In embodiments, the conductive material may include one or more of silver, aluminum, copper, stainless steel, and a carbon-containing material. In this way, the current collector may have a tuned resistivity to provide directional control for electrical conductivity. For example, the produced current collector may be configured to provide an in-plane resistivity across a length in the xy-plane, as well as a through-plane resistivity in the z-direction, which is greater than or about $1 \times 10^4$ ohm-m in embodiments. Additionally, exemplary current collectors may have an in-plane and through-plane resistivity of between about $1 \times 10^{-3}$ ohm-m and about 1,000 ohm-m. In other embodiments, more conventional electrical distribution may be employed, where current is transferred along conductive current collectors into and out of the cell.

Figure 3:
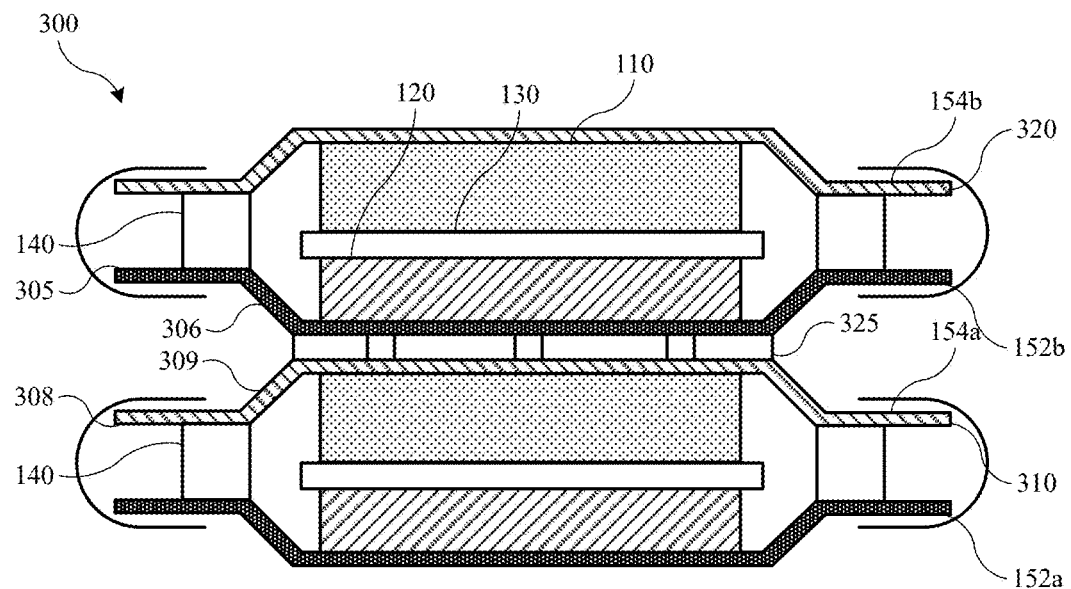
FIG. 3 shows a schematic cross-sectional view of a portion of an energy storage device according to some embodiments of the present technology.

Turning to FIG. 3 is shown a schematic cross-sectional view of a portion of an energy storage device 300 according to embodiments of the present technology. As illustrated, energy storage device 300 may include a first battery cell 310 and a second battery cell 320, and may include any number of battery cells similar to those discussed above with regard to FIGS. 1 and 2. Energy storage device 300 is shown as two cells for illustrative purposes, but it is to be understood that energy storage devices encompassed by the present technology may include one or more cells up to hundreds or thousands of coupled cells in some multi-cell battery designs. Similar to FIG. 1, energy storage device 300 may include a number of cells, and each cell may include a first current collector 152 and a second current collector 154. In some embodiments, first current collectors 152 may be anode current collectors, and second current collectors 154 may be cathode current collectors. In embodiments, at least one of the first current collector 152 and the second current collector 154 may be a metal current collector, although in embodiments both or neither current collectors may be metal or a conductive material in embodiments. Any of the cell components may be or include any of the materials discussed above with regard to FIGS. 1 and 2.

Additionally within each cell may be electrode components. An anode active material 120 may be disposed on or contact each first current collector 152a, 152b. The anode active material may contact the first surface 305 of first current collector 152. In this way, seal 140 and anode active material 120 may both be in contact or coupled with first surface 305 of first current collector 152. Similarly, a cathode active material 110 may be disposed on or contact second current collector 154a, 154b. The cathode active material 110 may contact the first surface 308 of second current collector 154, and thus cathode active material 110 and seal 140 may both be in contact or coupled with first surface 308 of second current collector 154. Exemplary cells may also include a separator 130 disposed between anode active material 120 and cathode active material 110.

As illustrated, second battery cell 320 may be aligned with first battery cell 310, and the two cells may be in vertical alignment with each other so cathode current collector 154b of first current collector 310 is positioned adjacent anode current collector 152b of second battery cell 320. As previously explained, current transmission between the two cells may occur in a z-direction, or vertically, through the cells. Thus, current may pass from first cell 310 to second cell 320 with cathode current collector 154a of first cell 310 to anode current collector 152b of second cell 320, and vice versa, during the operations of charging and discharging of the battery or energy storage device 300. The two cells may be coupled together during packaging of cells into an energy storage device. However, to facilitate current transmission between the two cells of the battery, the coupling may include a conductive material, or may provide access for electrical contact between cathode current collector 154a and anode current collector 152b.

A patterned coupling material 325 may be disposed between the first battery cell 310 and the second battery cell 320 as illustrated in the figure. The patterned coupling material 325 may join cathode current collector 154a of first battery cell 310 with anode current collector 152b of second battery cell 320. Unlike some conventional technologies utilizing a conductive adhesive, patterned coupling material 325 may include either a non-conductive adhesive or a conductive bonding material. In some embodiments further described below, the patterned coupling material may be or include a multi-component system. Patterned coupling material 325 may be disposed between adjacent cells. As illustrated, patterned coupling material 325 is disposed on a second surface 306 of anode current collector 152b opposite first surface 305 on which anode active material 120 is disposed. Similarly, patterned coupling material 325 may be disposed on a second surface 309 of cathode current collector 154a opposite first surface 308 on which cathode active material 110 is disposed.

In some embodiments, patterned coupling material 325 is a non-conductive adhesive. The non-conductive adhesive may be discontinuously coated between cathode current collector 154a and anode current collector 152b. Because the present technology may be used in battery configurations including z-direction electrical transmission between cells, gaps may be maintained within the coating pattern of the non-conductive adhesive. During coupling of the second battery cell 320 with the first battery cell 310, an amount of compression may be delivered to provide contact between regions of the cathode current collector 154a and the anode current collector 152b. In some embodiments direct contact may be formed between the two current collectors at a plurality of locations across an area of the cells where the coupling material 325 has not been applied or where gaps occur in the coating. In some embodiments, an amount of deformation may occur to one or both current collectors to allow the contact.

The adhesive may be applied to either battery cell during fabrication of the energy storage device 300. The adhesive may be applied in an amount to ensure that the adhesive does not become continuous during compression or lamination of the cells. Should the adhesive form a continuous layer between the cathode current collector 154a and the anode current collector 152b, electrical conductivity between the adjacent cells may be limited or prevented, which may prevent operation of the battery. Exemplary adhesives that may be used in the present technology may be or include any number of adhesives including polymer adhesives. For example, adhesives that may be used or useful in the present technology may include polyurethane, acrylate including methacrylate and ethylene ethyl acrylate, epoxy, hydrocarbon polymeric materials including polyethylene and polypropylene containing adhesives, or any other adhesive that may couple current collectors of adjacent cells.

Patterned coupling material 325 may also be a conductive material in some embodiments. For example, patterned coupling material 325 may be or include a metal-containing material configured to bond with one or both current collectors between which the patterned coupling material 325 is disposed. For example, patterned coupling material 325 may be a metal-containing material characterized by a melting temperature below or about 100° C. and may be characterized by a melting temperature below or about 90° C., below or about 80° C., below or about 70° C. below or about 60° C., below or about 50° C., below or about 40° C., or less in some embodiments. The metal-containing material may be or include one or more metals or an alloy, and may include tin, lead, copper, silver, bismuth, indium, zinc, antimony, or any other conductive or metal material. Additionally, the metal-containing material may include a flux, which may be or include any known materials useful to facilitate bonding of the metal-containing materials with the current collector materials, such as rosin, acidic fluxes, activated fluxes, etc.

In embodiments in which the patterned coupling material 325 is a metal-containing material, a lamination process or heating process may be used to couple a first cell 310 with a second cell 320. Because either cell may include heat-sensitive components within the cell structure, the metal-containing material may be characterized by a melting temperature below 150° C., or any of the previously noted temperatures to protect damage to the cells. When melted, the metal-containing material may form a conductive bond between the cathode current collector 154a and the anode current collector 152b. The pattern of the metal-containing material may be formed to control conductivity between adjacent cells. For example, the metal-containing material may be formed in a discontinuous pattern, and may be formed in unconnected sections to limit xy-transmission of current between the battery cells.

In some embodiments, batteries and battery cells of the present technology may be characterized by lateral dimensions greater than 1 cm, and may be characterized by lateral dimensions greater than or about 10 cm, greater than or about 50 cm, greater than or about 1 m, or more. As battery size increases, the amount of adhesive strength may increase to manage the increased weight, as well as the effects of vibration or impact of a device in which the battery is disposed. Accordingly, an amount of adhesive may be required that is greater than common amounts used in microelectronics, in which a cell may be characterized by lateral dimensions less than a few millimeters, for example. In some embodiments of the present technology, the adhesive may be applied to a thickness of a few micrometers or less, and applied in a pattern affording contact between adjacent current collectors in gap regions of the adhesive coating.

Because batteries of the present technology may be utilized in devices that may be prone to vibration, movement forces, or impact, patterned coupling materials according to some embodiments of the present technology may be characterized by a Young's modulus greater than or about 100 MPa. In some embodiments, the patterned coupling materials may be characterized by a Young's modulus greater than or about 150 MPa, greater than or about 200 MPa, greater than or about 250 MPa, greater than or about 300 MPa, greater than or about 500 MPa, greater than or about 1,000 MPa, greater than or about 2,500 MPa, greater than or about 5,000 MPa, or more. In some embodiments, the patterned coupling material may be characterized by a glass transition temperature greater than or about 80° C., and may be characterized by a glass transition temperature greater than or about 90° C., greater than or about 100° C., greater than or about 110° C., greater than or about 120° C., greater than or about 130° C. greater than or about 140° C., greater than or about 150° C., or higher.

Figure 4:
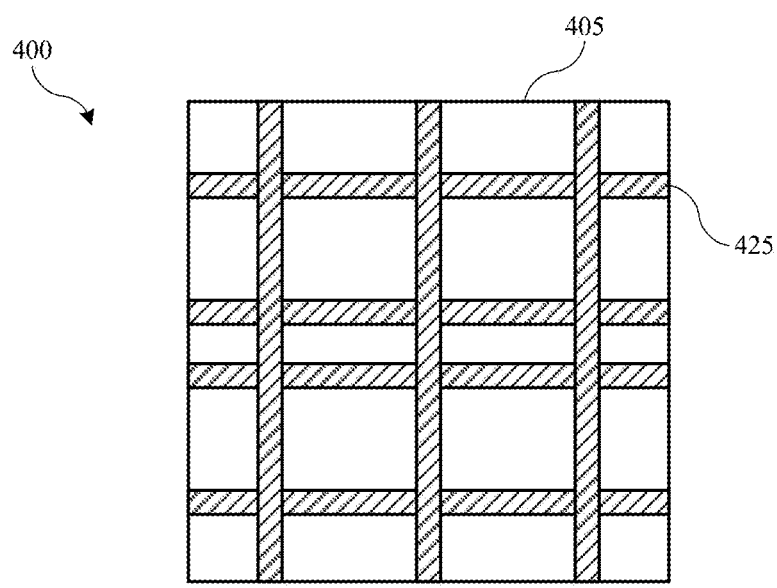
FIG. 4 shows a schematic plan view of a portion of an energy storage device according to some embodiments of the present technology.

FIG. 4 shows a schematic plan view of a portion of an energy storage device 400 according to some embodiments of the present technology. Energy storage device 400 may include any of the materials or components previously described, and may illustrate a current collector 405 on which a patterned coupling material 425 has been disposed. Current collector 405 may be an anode current collector or a cathode current collector, and may illustrate a surface to be coupled with a current collector of a second battery cell in order to provide current transfer between two battery cells of a battery. Patterned coupling material 425 is shown in an exemplary cross-hatch pattern across a surface of current collector 405, although this is not intended to limit the present technology. Any formation or pattern including parallel lines, cross patterns, spot depositions, or other patterns may be used to provide the coupling between adjacent battery cells of a battery according to embodiments of the present technology.

Patterned coupling material 425 may be either a non-conductive adhesive or a metal-containing material as previously discussed. The material used for the patterned coupling material may affect the pattern formed across the surface of the current collector 405. For example, when patterned coupling material 425 is a non-conductive adhesive, the pattern may include sufficient gaps within the pattern to ensure that on coupling of a second battery cell, current collector 405 and a current collector of the second battery cell may directly contact at one or more locations across the surfaces of the current collectors. As an additional example, when a metal-containing material is used as the patterned coupling material, forming a sheet between the two current collectors may be acceptable as the material may be conductive. However, in some embodiments utilizing a metal-containing material, an interlocking pattern may not be formed to control xy-directional transmission of current in the battery produced. These examples are included merely to explain considerations during material selection, and are not intended to limit the actual patterns utilized for patterned coupling materials according to the present technology.

Figure 5:
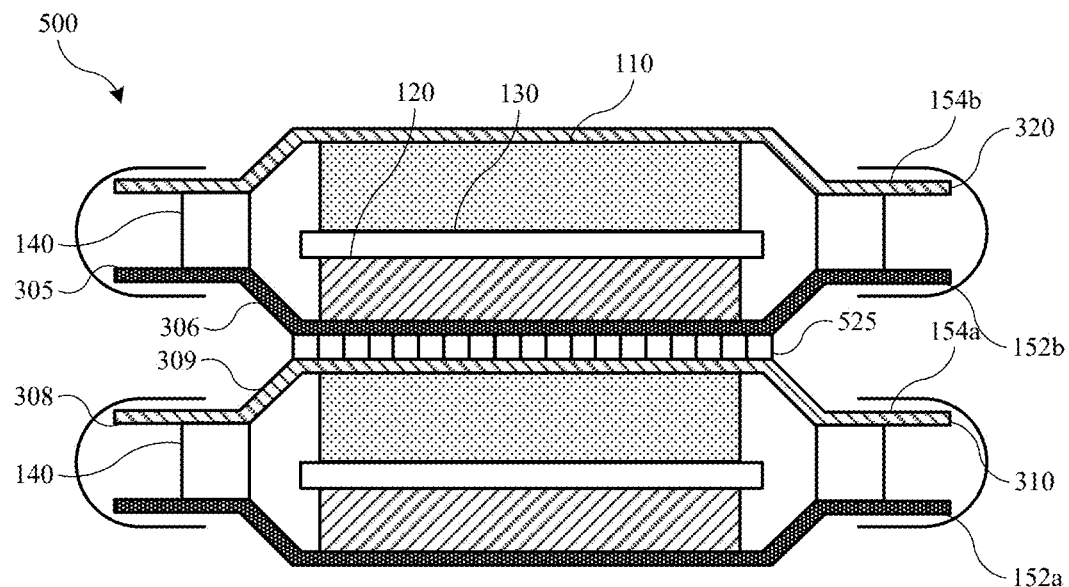
FIG. 5 shows a schematic cross-sectional view of a portion of an energy storage device according to some embodiments of the present technology.

FIG. 5 shows a schematic cross-sectional view of a portion of a stacked battery 500 according to some embodiments of the present technology. Stacked battery 500 may include any of the components or materials previously described, and may illustrate a multi-component material utilized to couple and electrically connect two battery cells of a battery according to some embodiments of the present technology. Stacked battery 500 may include similar components as illustrated with respect to energy storage device 300 of FIG. 3, and may include a first battery cell 310 and a second battery cell 320 as previously described. Second battery cell 320 may be disposed in vertical alignment with first battery cell 310. Each battery cell may include an anode current collector 152 on which an anode active material 120 is disposed on a first surface 305 of the anode current collector. Each battery cell may also include a cathode current collector 154 on which a cathode active material 110 is disposed on a first surface 308 of the cathode current collector. The cells may include a separator 130 positioned between the anode active material 120 and the cathode active material 110. The cells may also include one or more seals 140 enclosing the active areas within each battery cell.

Disposed between first battery cell 310 and the second battery cell 320 may be an adhesive foil 525. Adhesive foil 525 may be coupled with a second surface 306 of anode current collector 152b opposite first surface 305 on which anode active material 120 may be disposed. Adhesive foil 525 may also be coupled with second surface 309 of cathode current collector 154a opposite first surface 308 on which cathode active material 110 may be disposed. Adhesive foil 525 may electrically couple the cathode current collector 152a of first battery cell 310 with the anode current collector 154b of second battery cell 320. Adhesive foil 525 may include a metal material having adhesive disposed on opposite sides of the foil. For example, a metal material may have a discontinuous coating of a non-conductive adhesive formed or deposited on a first surface of the foil and on a second surface of the foil opposite the first. The adhesive foil 525 may then be laminated between cathode current collector 154a of first battery cell 310 and anode current collector 152b of second battery cell 320. This configuration may provide additional flexibility and malleability to form a plurality of contact locations between the foil and the current collectors of the battery cells. Adhesive foil 525 may be or include a stand-alone component and may also be formed in layers on one or both current collectors as will be described below.

Figure 6A:
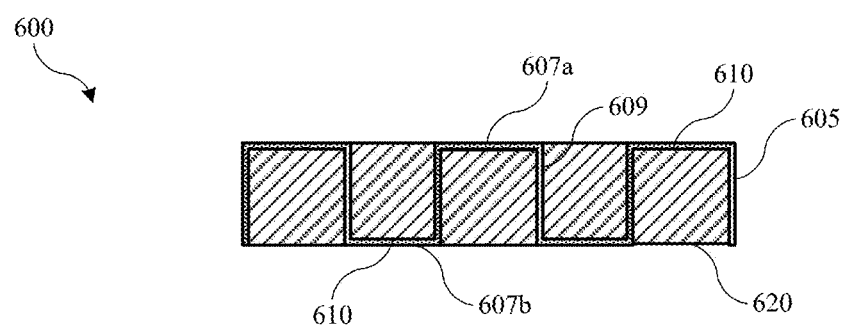
FIGS. 6A-6B show schematic cross-sectional views of exemplary adhesive foils according to some embodiments of the present technology.
Figure 6B:
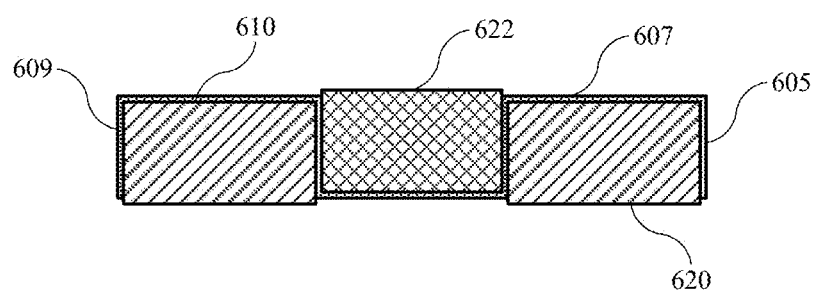

FIGS. 6A-6B show schematic cross-sectional views of exemplary adhesive foils 600 according to some embodiments of the present technology. Adhesive foils 600 may include a metal material 605 as well as one or more adhesive materials 620 disposed on the metal material 605. Metal material 605 may include alternating sections extending orthogonally from one another to form a pattern of adhesive foil 600. As illustrated in the figures, metal material 605 may include a set of first sections 607 that may extend parallel to the anode current collector or the cathode current collector of the battery cells with which the adhesive foil is coupled. First sections 607 may also include subsets of the first sections that are vertically disposed from one another to contact the current collectors of the two battery cells. For example, a first subset 607a of first sections 607 may be located vertically offset from a second subset 607b of first sections 607. By this configuration, first subset 607a of first sections 607 may be positioned to contact anode current collector 152b of second battery cell 320, and second subset 607b of first sections 607 may be positioned to contact cathode current collector 154a of first battery cell 310. Although described as being disposed vertically from one another, it is to be understood that any of the components may be similarly offset horizontally or in some other lateral dimension depending on the orientation of the battery.

Metal material 605 may also include a set of second sections 609 extending substantially orthogonally to the first sections 607 and the current collectors of the two battery cells. It is to be understood that second sections 609 may not extend exactly normal to first sections 607 due to compression that may provide deformation of the adhesive foil 600, which may cause elongation or compression in one or more ways. For example, second sections 609 may bow slightly under compression or may be offset slightly under elongation changing an angled relation from normal to off by any number of degrees including up to or at least 5°, 15°, 30°, 45°, or more depending on the amount of compression that may occur during coupling of the battery cells.

With the set of first sections 607 and the set of second sections 609, metal material 605 may define a series of trenches 610 along a length of the metal material. An adhesive 620 may be disposed within each trench 610 of the series of trenches to provide coupling of the adhesive foil 600 with current collectors of associated battery cells. The adhesive may be a non-conductive adhesive in some embodiments, and may be any of the adhesives previously described. The metal material may be any metallic, metal-containing, or conductive material that may facilitate electrical transmission between the cathode current collector 154a of the first battery cell and the anode current collector 152b of the second battery cell. For example, the metal material may be or include copper, aluminum, titanium, or any other material that may provide adequate electrical conductivity between adjacent cells.

As illustrated in FIG. 6A, first sections 607 may be positioned adjacent either cathode current collector 154a, such as with second subset 607b of first sections 607, or adjacent anode current collector 152b, such as with first subset 607a of first sections 607. When the battery is formed, multiple areas of electrical contact may be established between adhesive foil 600 and each current collector along first sections 607 to ensure a substantially or essentially uniform distribution of electricity may be provided between the adjacent cells. Adhesive 620 may also contact each current collector in a plurality of locations to provide thorough and uniform coupling between the battery cells.

Adhesive foil 600 may be characterized by a number of geometries as illustrated depending on a determined distribution of electrical or adhesive contact between two battery cells. For example, FIG. 6A illustrates a fairly square pattern of metal material 605, which will provide closer positioning of adjacent portions of adhesive 620. FIG. 6B illustrates an extended set of first sections 607, wherein the first sections 607 are characterized by a greater length than a corresponding length or height of each section of second sections 609. In other embodiments, metal material 605 may include some first sections 607 characterized by a length illustrated in FIG. 6A, and some first sections 607 characterized by a length illustrated in FIG. 6B. Any number of adjustments may be made to provide different electrical contact patterns between current collectors of two battery cells coupled with adhesive foil 600.

FIG. 6B also illustrates additional incorporations of adhesive 620. As illustrated, adhesive 620 extends proud of metal material 605, which may ensure complete coupling between the adhesive foil and the associated current collectors. In other embodiments, adhesive 620 may be recessed within trenches 610 of metal material 605. In this way, an amount of compression of adhesive foil 600 may be performed without causing adhesive 620 to spill across first sections 607 that may be configured to contact a current collector, or to limit such spillage to ensure adequate electrical contact between the metal material 605 and associated current collectors of battery cells.

FIG. 6B also shows that multiple adhesives may be utilized in some embodiments of the present technology. For example, adhesive foil 600 may be positioned between current collectors as previously described, such that adhesive 620 may be in communication with a cathode current collector 154a of a first battery cell 310, and adhesive 622 may be in communication with an anode current collector 152b of a second battery cell 320. Adhesives 620 and 622 may be the same in some embodiments, and in some embodiments adhesive 620 may be different from adhesive 622. For example, because cathode current collector 154a may be a different material from anode current collector 152, adhesives used to couple with each of these materials may be adjusted accordingly. Thus, adhesive 620 may be selected or modified to provide improved adhesion with cathode current collector 154a, while adhesive 622 may be selected or modified to provide improved adhesion with anode current collector 152b. Any number of variations may be performed in consideration of the materials used in embodiments of the present technology.

Figure 7A:
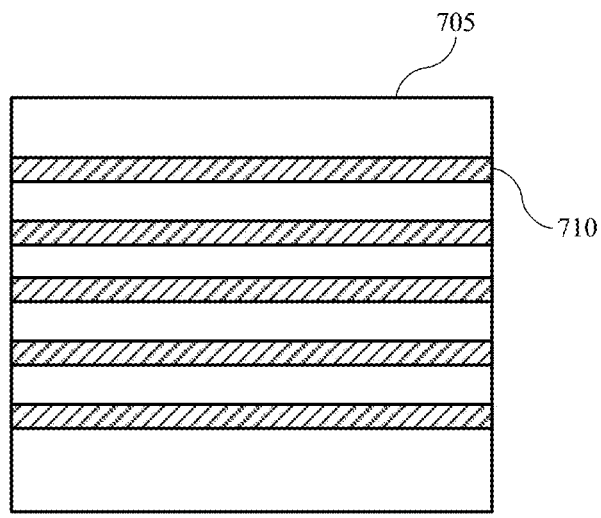
FIGS. 7A-7C show schematic plan views of exemplary applications of an adhesive foil according to some embodiments of the present technology.
Figure 7B:
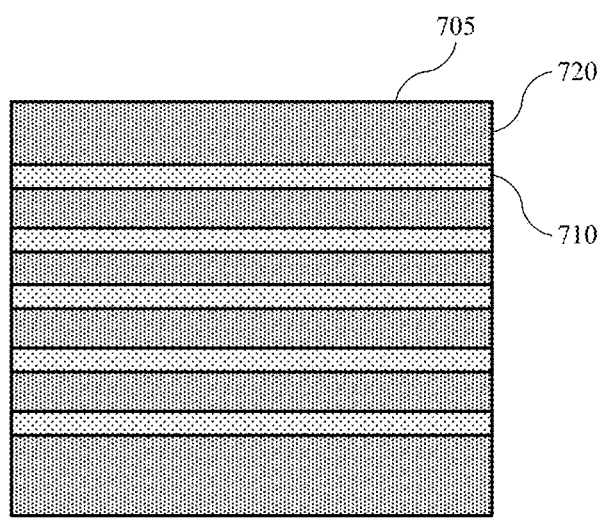
Figure 7C:
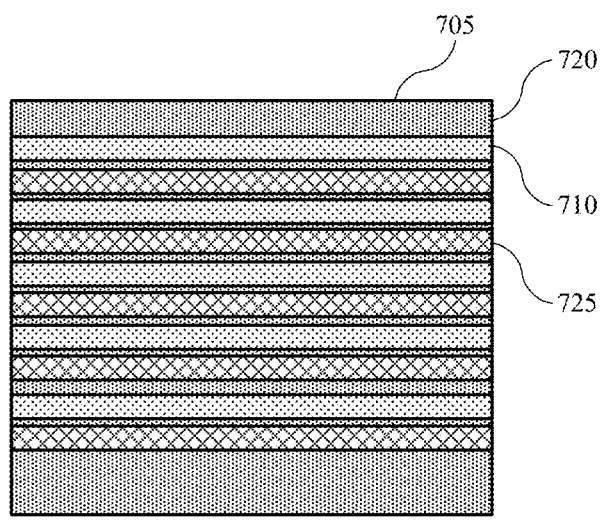

Adhesive foils according to the present technology may be standalone components in some embodiments. Additionally, adhesive foils may be formed on one or both current collectors in some embodiments of the present technology. FIGS. 7A-7C show schematic plan views of exemplary operations of an adhesive foil being formed according to some embodiments of the present technology. The materials may be or include any of the materials previously described, and may be formed on any of the structures described above. As illustrated in FIG. 7A, a first adhesive 710 may be deposited in a first pattern along a first current collector 705 of a first battery cell. The deposition may include any known coating techniques including nozzle application, inkjet printing, gravure printing, or any other process that may deliver a first adhesive 710 in a discontinuous pattern in at least one lateral dimension along a current collector 705. The pattern may be formed in any of the previously discussed patterns, and may be included in parallel lines as illustrated.

Subsequent formation of the first adhesive patterning, a layer of conductive material may be formed across the first current collector. As illustrated in FIG. 7B. conductive material 720 may be formed or deposited over adhesive 710, shown as profiled beneath the conductive material 720, and current collector 705. The layer of conductive material may extend across the topography of the current collector 705 with the patterned first adhesive 710. For example, the conductive material may contact current collector 705 within gaps in the first pattern of the first adhesive. The conductive material may also extend along the profile of the adhesive material to provide a continuous coating along sidewalls or shapes of the adhesive 710. Conductive material 720 may be a formed component that is laid or placed over adhesive 710. In other embodiments, conductive material 720 may be formed by a deposition process, such as a vapor deposition. The layer of conductive material may be characterized by a thickness less than or about 20 µm in embodiments, and may be characterized by a thickness less than or about 15 µm, less than or about 10 µm, less than or about 5 µm, or less.

A second adhesive 725 may be deposited in a second pattern on the conductive material 720 as illustrated in FIG. 7C. The second adhesive 725 may be the same adhesive as the first adhesive or the two adhesives may be different as previously discussed. The second pattern may be the same or different from the first pattern, and in some embodiments, such as illustrated, the second pattern is the same as the first pattern although laterally offset from the first pattern to limit a thickness of the adhesive foil. The second pattern may include depositing the adhesive within recesses formed by the conductive material between sections of the first adhesive material. The second adhesive may be formed by any of the previously discussed processes. After formation of the adhesive foil, a second battery cell may be coupled with the first battery cell along a second current collector as previously described and illustrated. The coupling may be performed so a second current collector of the second battery cell may contact the conductive material between regions of the second adhesive, such as where formed on the first adhesive.

Figure 8:
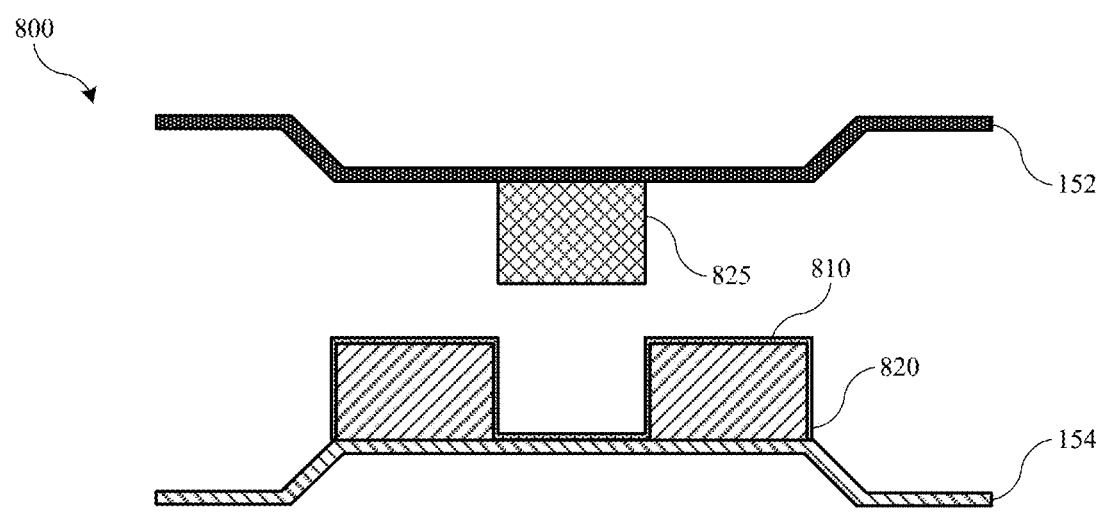
FIG. 8 shows a schematic cross-sectional view of a portion of an energy storage device according to some embodiments of the present technology.

Forming an adhesive foil may occur over a single current collector as discussed with reference to FIG. 7, or may be formed across two battery cells to be coupled. FIG. 8 shows a schematic cross-sectional view of a portion of an energy storage device 800 during formation according to some embodiments of the present technology. As illustrated, FIG. 8 includes a first current collector 154 of a first battery cell, which is the cathode current collector of the first battery cell. The cathode current collector may have a first adhesive 810 formed in a pattern on the current collector, and may have a conductive material 820 formed or placed overlying the first adhesive 810. It is to be understood that the materials illustrated are not shown to scale, and either component may be characterized by a thickness previously described. For example, metal material 820 may be characterized by a thickness equal to or greater than the thickness of the adhesive material 810 in embodiments, and either material may be characterized by any of the thicknesses previously discussed.

A second adhesive 825 may be formed in a second pattern on a current collector 152 of a second battery cell, such as an anode current collector. The second adhesive 825 may be the same as the first adhesive 810, or may be different as discussed above. The second battery cell may be coupled with the first battery cell to perform the formation of the adhesive foil, by joining the second adhesive 825 with the formed structure on the cathode current collector 154. Such a process may allow the adhesives to be pre-applied to the current collectors, which may reduce formation queue times in some embodiments. It is to be understood that the patterns may be reversed as well, where the first adhesive and conductive material may be formed on an anode current collector and the second adhesive may be formed on the cathode current collector. Any other variation in the formation is similarly encompassed to provide a coupling material or configuration between battery cells of a battery, where the coupling material may be characterized by decoupled electrical and adhesive characteristics.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A stacked battery comprising:
    a first battery cell comprising a cathode current collector;
    a second battery cell disposed on the first battery cell, wherein the second battery cell comprises an anode current collector; and
    an adhesive foil positioned between and electrically coupling the cathode current collector of the first battery cell with the anode current collector of the second battery cell,
    wherein the adhesive foil comprises a metal material characterized by alternating sections including a set of first sections extending parallel to the anode current collector or the cathode current collector, and a set of second sections extending orthogonally to the anode current collector or the cathode current collector.

2. The stacked battery of claim 1, wherein the alternating sections define a series of trenches along a length of the metal material, and wherein an adhesive is disposed within each trench of the series of trenches.

3. The stacked battery of claim 2, wherein the adhesive comprises a non-conductive adhesive.

4. The stacked battery of claim 1, wherein each section of the set of first sections alternates between being positioned adjacent the cathode current collector and the anode current collector.

5. The stacked battery of claim 1, wherein each section of the set of first sections is in electrical contact with either the cathode current collector of the first battery cell or the anode current collector of the second battery cell.

6. The stacked battery of claim 1 wherein a subset of sections of the set of first sections is characterized by a length greater than a length of each section of the set of second sections.

7. The stacked battery of claim 1, wherein the metal material comprises at least one metal selected from a group consisting of aluminum, copper, and titanium.

8. The stacked battery of claim 1, wherein the stacked battery is characterized by an area greater than about 0.25 $m^2$.

* * * * *